UNITED STATES PATENT OFFICE.

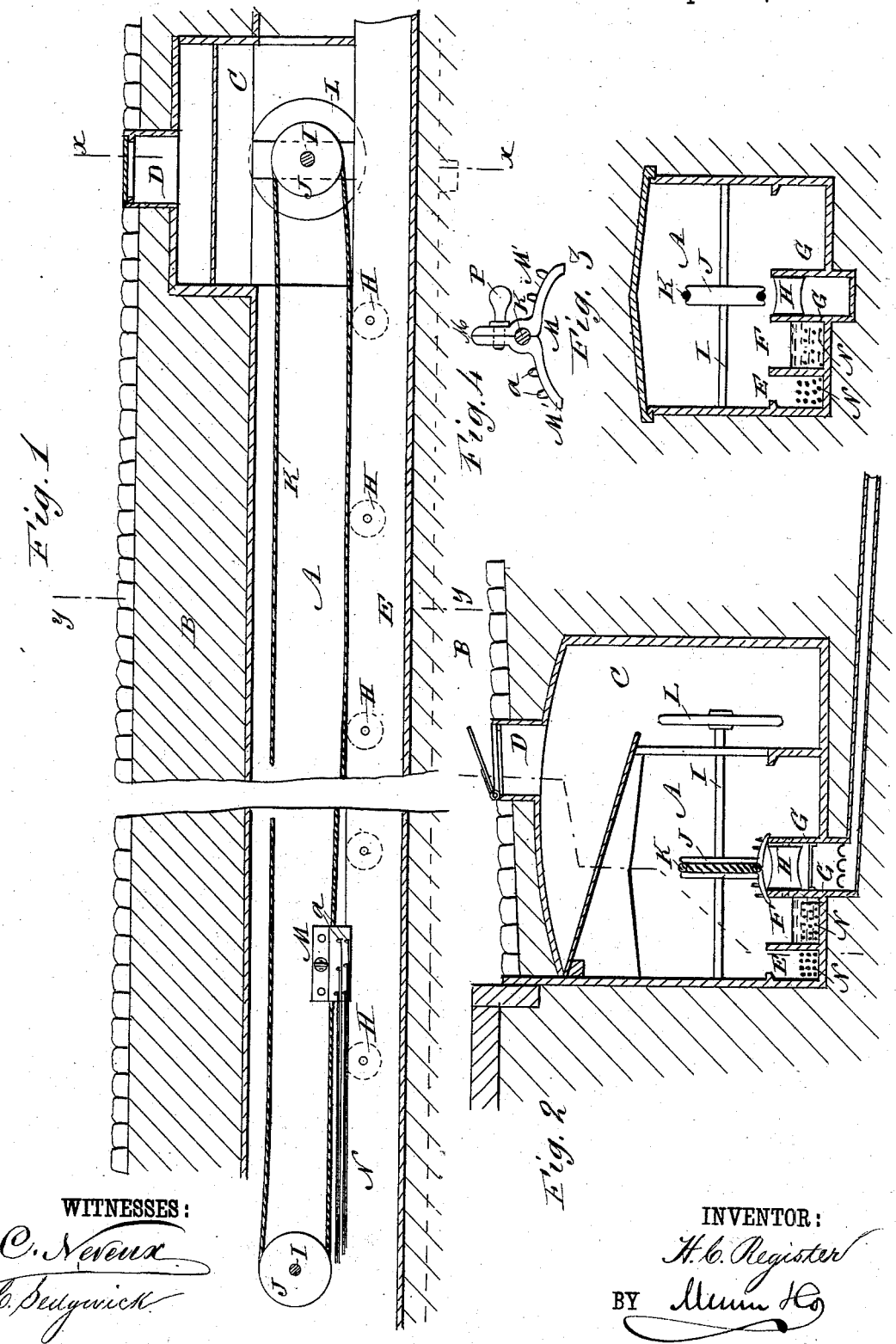

HENRY C. REGISTER, OF PHILADELPHIA, PENNSYLVANIA.

DEVICE FOR LAYING AND HOLDING UNDERGROUND ELECTRIC WIRES.

SPECIFICATION forming part of Letters Patent No. 265,147, dated September 26, 1882.

Application filed April 1, 1882. (No model.)

*To all whom it may concern:*

Be it known that I, HENRY C. REGISTER, of the city of Philadelphia, in the county of Philadelphia and State of Pennsylvania, have invented a new and Improved Device for Laying and Holding Underground Electric Wires, of which the following is a full, clear, and exact description.

The object of my invention is to facilitate the laying of underground electric wires; and to this end my invention consists in the peculiar construction and arrangement of parts, as hereinafter more fully set forth.

Reference is to be had to the accompanying drawings, forming a part of this specification, in which similar letters of reference indicate corresponding parts in all the figures.

Figure 1 is a longitudinal sectional elevation of my improved device for holding underground electric wires. Fig. 2 is a cross-sectional elevation of the same at the man-hole on the line $x\,x$, Fig. 1. Fig. 3 is a cross-sectional elevation of the same on the line $y\,y$, Fig. 1. Fig. 4 is an end elevation of the clamp-carriage for carrying the wire.

A water-tight longitudinal boxing, A, made of cast or sheet iron, or of wood or clay, is placed in the street under the roadway B, and at suitable intervals this boxing is provided with enlargements C, provided with man-holes D, leading to the street. On the bottom of the longitudinal box A two or more longitudinal troughs or compartments, E and F, are provided, some for telephone and telegraph wires, and the others for electric-light wires. Two partitions, G, on the bottom of the longitudinal box A, extend throughout the length of the same, and near the upper edges of these partitions G a series of rollers, H, are journaled. In each enlargement C, at the end of a section, and at suitable intervals in the box A, a horizontal shaft, I, is journaled in suitable supports, and on each of these shafts a grooved pulley, J, is mounted directly above the middle line between the partitions G. Endless ropes or cables K pass over the pulleys J, and these cables can be moved by turning the shaft I by means of their hand-wheels L at the man-holes. These cables K rest on the rollers H, as shown in Fig. 1. If desired, those parts of the box in which the shafts are journaled may be provided with a shed-roof.

A carriage, M, provided on its upper surface with pegs $a$ for attaching the electric wires N, is of such width that its longitudinal edges can rest on the upper edges of the partitions G. The carriage is formed of two sections, M', provided with vertical flanges fitting against each other, which flanges are provided in the adjoining surfaces with longitudinal grooves for receiving the cable or rope K, on which the sections M' can be firmly clamped by means of the clamping-screw P.

The troughs or longitudinal compartments E and F can be filled with oil, or a preparation of rubber, silex, and asbestus can be used to insulate the wires; or, if desired, the wires can be coated in the same manner as marine cables are, or with any suitable non-conducting material, and the troughs can be filled with water, or the cables can be placed in the dry troughs.

A carriage may be arranged to be drawn through the longitudinal boxes, on which a man in a reclining position may be drawn from point to point, and the wires may thus be hung upon insulated pegs.

The operation is as follows: The clamping-carrier M is fastened to the cable or rope K at one man-hole D or enlargement C of the box A, and one or more wires, N, are attached to the pegs or staples $a$ of the carrier M, and by rotating the shaft I the carrier M will be carried to the next enlargement or man-hole D, and the wires N will have been carried through the box A from one station or enlargement C to the next, and can easily be placed into one of the compartments E or F. In this manner the wire N can be carried through any length of boxing A, for when the ends of the wires have arrived at one station—that is, at the end of one section of the boxing A—the wires can be attached to the carrier M of the next section, and so on. The wires can be removed in a similar manner.

The boxes A are to be made in sections of any desired length and of any desired shape of cross-section. The boxes are to be lined with some non-conducting cement or other non-conducting or insulating material.

Having thus described my invention, I claim as new and desire to secure by Letters Patent—

1. In a device for laying and holding underground electric wires, the combination, with the box A, provided with the enlargements C, and the partitions G, having rollers H journaled between them, of the shafts I, the pulleys J, the endless cable or rope K, and the carrier M, provided with studs $a$ and detachably secured to the said cable or rope, substantially as and for the purpose set forth.

2. In a device for holding and laying electric wires, the combination, with the box A, of the pulleys J, the endless cable or rope K, and the carrier M, consisting of the sections M', provided with studs $a$, and the clamping-screw P, substantially as herein shown and described, and for the purpose set forth.

HENRY C. REGISTER.

Witnesses:
I. W. DENNEY,
I. L. REGISTER,
LISLE STOKES.